(12) United States Patent
Afergan et al.

(10) Patent No.: US 8,332,484 B2
(45) Date of Patent: Dec. 11, 2012

(54) HYBRID CONTENT DELIVERY NETWORK (CDN) AND PEER-TO-PEER (P2P) NETWORK

(75) Inventors: Michael M. Afergan, Cambridge, MA (US); F. Thomson Leighton, Newtonville, MA (US); Jay G. Parikh, Redwood City, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 641 days.

(21) Appl. No.: 11/850,721

(22) Filed: Sep. 6, 2007

(65) Prior Publication Data

US 2008/0155061 A1    Jun. 26, 2008

Related U.S. Application Data

(60) Provisional application No. 60/843,158, filed on Sep. 6, 2006, provisional application No. 60/874,790, filed on Dec. 14, 2006.

(51) Int. Cl.
- *G06F 15/16* (2006.01)
- *G06F 15/177* (2006.01)
- *G06F 15/173* (2006.01)

(52) U.S. Cl. ........ 709/218; 709/219; 709/221; 709/225; 709/228; 709/229; 709/239; 709/240; 709/244

(58) Field of Classification Search .......... 709/217–229, 709/238–244

See application file for complete search history.

(56) References Cited

U.S. PATENT DOCUMENTS

| | | | |
|---|---|---|---|
| 6,108,703 A | 8/2000 | Leighton et al. | |
| 6,366,907 B1 | 4/2002 | Fanning et al. | |
| 7,111,061 B2 | 9/2006 | Leighton et al. | |
| 7,277,950 B1 | 10/2007 | Chapweske | |
| 7,293,093 B2 | 11/2007 | Leighton et al. | |
| 7,349,358 B2 | 3/2008 | Hennessey et al. | |
| 7,363,498 B2 | 4/2008 | Hennessey et al. | |
| 7,398,301 B2 | 7/2008 | Hennessey et al. | |
| 7,450,524 B2 | 11/2008 | Hennessey et al. | |
| 7,454,480 B2 | 11/2008 | Labio et al. | |

(Continued)

OTHER PUBLICATIONS

Dongyan, Xu; Kulkarni, Sunil Suresh; Rosenberg, Catherine; and Chai, Heung-Keung. "A CDN-P2P Hybrid Architecture for Cost-Effective Streaming Media Distribution". Department of Computer Sciences, School of Electrical and Computer Engineering, Purdue University. http://www.cs.purdue.edu/homes/dxu/pubs/MMCN03-enhanced.pdf. Published: Feb. 7, 2006.*

*Primary Examiner* — Ashok Patel
*Assistant Examiner* — Kevin Bechtel
(74) *Attorney, Agent, or Firm* — David H. Judson

(57) ABSTRACT

A content delivery network (CDN) typically includes a mapping system for directing requests to CDN servers. One or more peer machines become associated with the CDN, and the CDN mapping system is then used to enable a given peer to locate another peer in the P2P network, and/or a CDN server. Using this hybrid approach, CDN customer content may be delivered from the CDN edge network, from the P2P network, or from both networks. In one embodiment, customer content is uploaded to the CDN and stored in the edge network, or in a storage network associated therewith. The CDN edge network is then used to prime the P2P network, which may be used to take over some of the content delivery requirements for the customer content. The decision of whether to use edge network or peer network resources for delivery may be based on load and traffic conditions.

8 Claims, 3 Drawing Sheets

U.S. PATENT DOCUMENTS

| | | |
|---|---|---|
| 7,555,559 B2 | 6/2009 | Chapweske |
| 7,624,169 B2 | 11/2009 | Lisiecki et al. |
| 7,653,689 B1 * | 1/2010 | Champagne et al. ......... 709/206 |
| 2002/0163882 A1 * | 11/2002 | Bornstein et al. ............. 370/227 |
| 2004/0249939 A1 * | 12/2004 | Amini et al. .................. 709/225 |
| 2006/0029104 A1 * | 2/2006 | Jungck ........................ 370/498 |

* cited by examiner

HYBRID CONTENT DELIVERY NETWORK (CDN) AND PEER-TO-PEER (P2P) NETWORK

This application is based on and claims priority to Ser. No. 60/843,158, filed Sep. 6, 2006, and Ser. No. 60/874,790, filed Dec. 14, 2006.

BACKGROUND OF THE INVENTION

1. Technical Field

The present invention relates generally to content delivery in distributed networks.

2. Brief Description of the Related Art

Distributed computer systems are well-known in the prior art. One such distributed computer system is a "content delivery network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS request handling, provisioning, data monitoring and reporting, content targeting, personalization, and business intelligence. The term "outsourced site infrastructure" means the distributed systems and associated technologies that enable an entity to operate and/or manage a third party's Web site infrastructure, in whole or in part, on the third party's behalf.

Peer to peer (P2P) networks are also well-known in the prior art and have been used for file sharing and other purposes. A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network. Some entities and business models use a hybrid approach, such as a client-server structure for some tasks (e.g., searching) and a peer-to-peer structure for others.

BRIEF SUMMARY OF THE INVENTION

A content delivery network (CDN) typically includes a mapping system for directing requests to CDN servers. One or more peer machines become associated with the CDN, and the CDN mapping system is then used to enable a given peer to locate another peer in the P2P network, and/or a CDN server. Using this hybrid approach, CDN customer content may be delivered from the CDN edge network, from the P2P network, or from both networks. In one embodiment, customer content is uploaded to the CDN and stored in the edge network, or in a storage network associated therewith. The CDN edge network is then used to prime the P2P network, which may be used to take over some of the content delivery requirements for the customer content. The decision of whether to use edge network or peer network resources for delivery may be based on load and traffic conditions.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
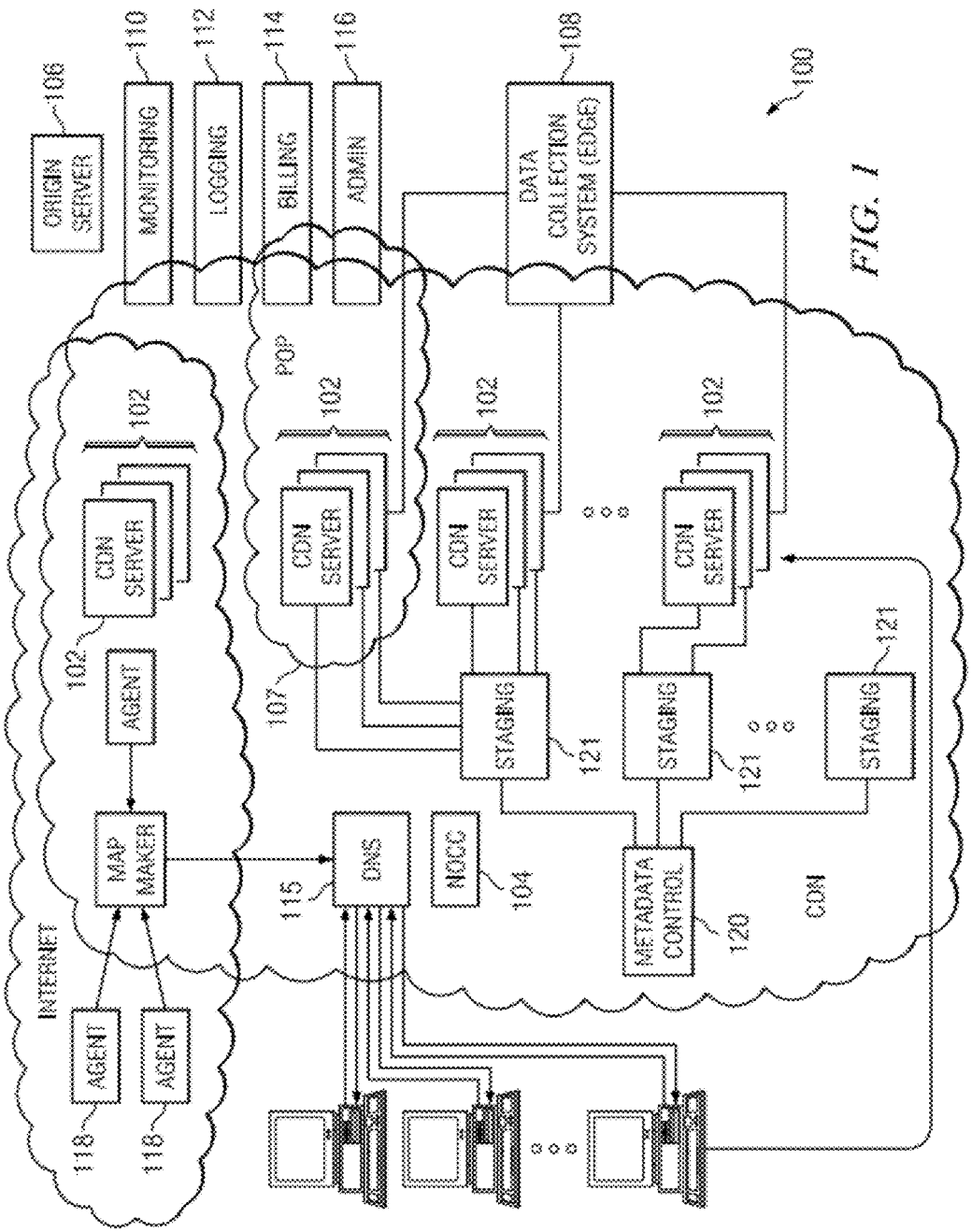
FIG. 1 is a representative content delivery network in which the subject matter herein may be implemented.
Figure 2:
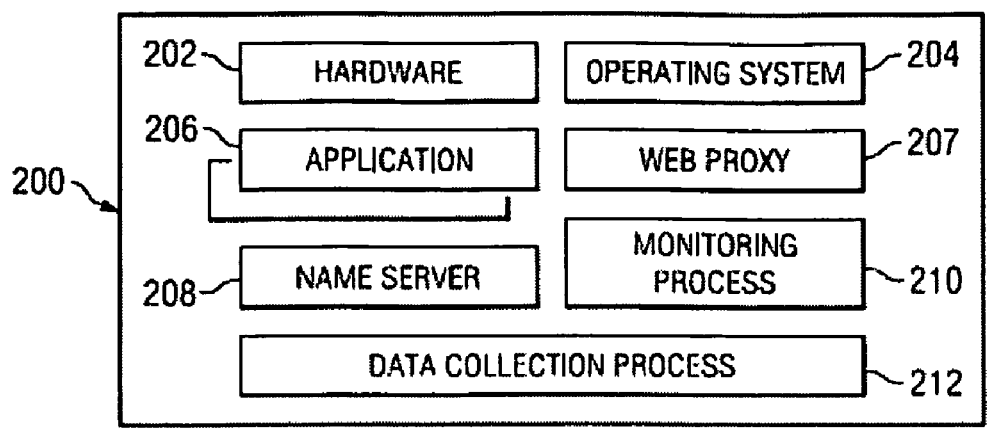
FIG. 2 is a representative edge server of the content delivery network of FIG. 1.

The present invention may be implemented in a content delivery network, such as illustrated in FIGS. 1 and 2. Use in a CDN is a not a limitation, however, as the present invention may be implemented in any environment in which one entity operates a distributed network from which third party content is distributed.

In a representative embodiment, a distributed computer system 100 is configured as a CDN and is assumed to have a set of machines 102 distributed around the Internet. Typically, most of the machines are servers located near the edge of the Internet, i.e., at or adjacent end user access networks. A Network Operations Command Center (NOCC) 104 may be used to administer and manage operations of the various machines in the system. Third party sites, such as Web site hosted on origin server 106, offload delivery of content (e.g., HTML (Hypertext Markup Language), embedded page objects, streaming media, software downloads, and the like) to the distributed computer system 100. Typically, content providers offload their content delivery by aliasing (e.g., by a DNS CNAME (Domain Name Service Canonical Name) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region 107 or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism comprising a metadata control server 120 and staging servers 121 may be used to distribute control information (e.g., metadata to manage content, to facilitate load balancing, and the like) to the edge servers. As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP Web proxy 207, a name server 208, a local monitoring process 210, a distributed data collection process 212, and the like. For streaming media, the machine typically includes one or more media servers, such as a Windows Media Server (WMS) or Flash 2.0 server, as required by the supported media formats.

A CDN edge server such as shown in FIG. 2 is configured to provide one or more extended content delivery features, preferably on a domain-specific, customer-specific basis, preferably using configuration files that are distributed to the edge servers using a configuration system. A given configuration file preferably is Xtensible Markup Language (XML) based and includes a set of content handling rules and directives that facilitate one or more advanced content handling features. The configuration file may be delivered to the CDN edge server via the distributed data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server. Then, when an edge server manager process receives a request for content, it searches an index file for a match on a customer hostname associated with the request. If there is no match, the edge server process rejects the request. If there is a match, the edge server process loads metadata from the configuration file to determine how it will handle the request. That handling process is described in U.S. Pat. No. 7,240,100.

The CDN DNS query handling mechanism directs each user request to a given CDN server for content delivery. In one approach to implementing this mechanism, a "top level" map directs a specific request to one of a given number of server regions, while a "low level" map further directs the request to a given server within a region. Thus, for example, the top level map may associate each Internet Protocol (IP) address block with a CDN server region that can deliver content to clients in that block most quickly. To prepare for generating this map, mapping agents (e.g., one per CDN server region) may collect the following information: (a) IP blocks (a list of IP address blocks currently in use in the Internet), (b) load (per-IP block measurements of the amount of web load currently being handled by the CDN, (c) communication costs (e.g., a table listing the measured communication cost for each {IP block, CDN server region} pair, and (d) capacity (e.g., an aggregate server and network capacity of each CDN server region). A combination of different methods may be used to put together the list of IP blocks representing all of the leaf networks (e.g., each an endpoint Local Area Network LAN on the global Internet): BGP (Border Gateway Protocol) peering, harvesting information from network registration databases (e.g., RIPE (Reseaux IP Europeens), APNIC (Asia Pacific Network Information Centre) and ARIN (American Registry of Internet Numbers)), and random traceroutes into very large blocks (e.g., UUNET). The load on the CDN generated by each IP block may be determined by gathering and aggregating measurements from the CDN content servers. One or more different communication costs may be used to determine the cost of communication between an IP block and a CDN server region: network health of server region (e.g., a binary metric indicating that the region is up or down), ASPATH (Autonomous System Path) length between the block and the server region (e.g., as supplied by BGP), round trip time (RTT) between the region's mapping agent and a given point in the IP block, packet loss rate between the region's mapping agent and the given point in the IP block, geographic distance, and perhaps others. These metrics may be combined into a single cost metric for each IP block, server region pair, with the priority, or weighting, of each individual metric set to be proportional to its position on the list. Two types of capacity measurement may be made: total server capacity in each region and physical network capacity in each region. The server capacity is determined, for example, from the number of servers currently up in a region. Physical network capacity is determined, for example, with packet pair measurements. Region capacity may be calculated as a given function (e.g., the minimum) of these two measurements.

In this example, the top level map maps each IP block to a given CDN server region. One technique for generating the top level map involves identifying a number of candidate regions for each IP block (e.g., based on the {IP block, server region} communication costs), generating a bipartite graph using all of the measured and collected network information (e.g., with one side of the graph representing each of the IP blocks and the other side representing CDN server regions), and then running a min-cost flow algorithm on the graph. Each IP block node is labeled with its measured load, which is treated as the "flow" coming from that node. Running the algorithm results in an optimal assignment of IP block load to server regions. This assignment is the top level map, which is generated periodically and then delivered to the dynamic DNS request handling mechanism.

The above map generation process is merely exemplary and is not meant to limit the present invention. Thus, as an alternative, a top level may perform a first delegation to a given edge server region based, for example, on BGP or geo information. Within a given region, one or more additional decisions may then be made. Thus, for example, a low level name server in the region may use a first map to decide which region should receive the request (this may or may not be the region to which the top level delegated the request); this low level name server in the selected region then can use a second map to select an edge server Web proxy within the region to handle the request. To create the maps, software agents in every edge server region periodically perform tests (e.g., pings and trace routes) against devices or locations on the public Internet. Data collected from those tests are provided to the various map making processes.

The subject matter herein describes a hybrid CDN and P2P network (a "hybrid CDN-P2P"). Thus, for example, one or more peers of a P2P network are used as edge servers or edge server regions of the CDN; alternatively, given peers in the P2P leverage the CDN by taking advantage of given features or data that are made available from the CDN infrastructure. As another alternative, a P2P network uses a CDN as a failover source for given content in the event a given peer cannot locate the content from another peer.

Figure 3:
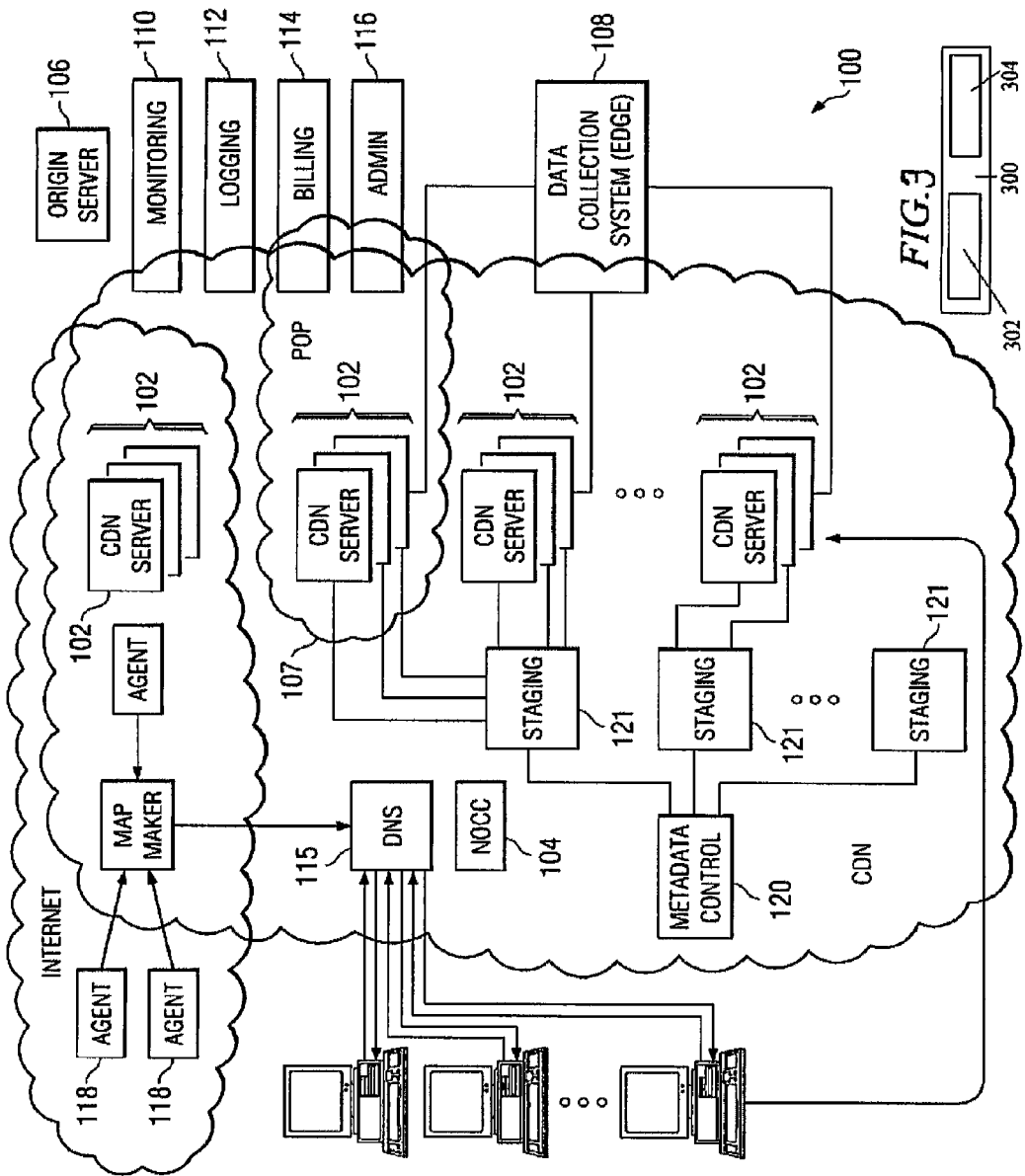
FIG. 3 is a representative hybrid CDN-P2P network.

FIG. 3 illustrates a basic hybrid CDN-P2P network. In this example, which is merely representative, P2P network 300 comprises peer machine 302 and peer machine 304, and peer 302 forms part of the CDN or has the ability to access and use given CDN infrastructure or components or data. One way to configure a peer into the CDN may be as described in U.S. Pat. No. 7,010,578, which is incorporated by reference, although this technique should not be taken to limit the subject matter herein. Of course, the P2P network 300 may have any number of peer machines, and typically there will be numerous such machines, with different machines coming in and out of the network, typically on an ad hoc basis. A typical peer machine is a server, a workstation, a personal computer or other computing device or entity that is not otherwise part of the CDN itself and that has sufficient computing and bandwidth capabilities to perform some of the functions required of an edge server in the CDN, or to take advantage of given CDN infrastructure, resources or data. As such, typically, the peer comprises a processor, and includes sufficient memory and disk storage to support an operating system, application programs (in some cases, web proxies and media servers), network interfaces, user and other man-machine interfaces, or the like. The particular hardware and software requirements of any machine are not an aspect of the present invention.

According to one embodiment, the CDN mapping system (or components thereof) as described generally above are provided to facilitate mapping a given peer to a nearest peer (in the P2P network) when the given peer desires to obtain given content from another peer. In the prior art, P2P networks have suffered by the inability of peers to locate other peers intelligently. According to the present invention, a peer is provided the ability to access CDN mapping infrastructure, components or data (e.g., maps) to facilitate peer location. In the context of FIG. 3, peer 302 is provided with the ability to access CDN infrastructure (e.g., map machines, maps, or other similar data) to determine the location of a nearby peer (such as peer 304) when it is desired to fetch given content. In such case the CDN mapping architecture is augmented so as include the P2P network nodes in the CDN map. Alternatively, or in addition to augmenting the CDN mapping infrastructure, given peer nodes are provided with CDN mapping processes or tools (e.g., software agents) to facilitate the peers being included in the map making process. In this way, the peers are simply nodes in the CDN architecture and become part of the overall map making process.

According to an aspect of the invention, assume a peer node desires to obtain a given content file (e.g., a graphic, an image, an application, a media file, a software download, or any other digital data irrespective of format). The peer node executes a given access tool, such as a web browser, a media player, or equivalent, to request the content file, typically via a Uniform Resource Locator (URL). The request (or some portion thereof) is directed to the CDN, which in one embodiment then returns to the peer node a file, sometimes referred to as a metafile. In one embodiment, this metafile includes one or more CDN or hybrid CDN-P2P domains or sub-domains that can then be used by the peer node to obtain the desired content. Thus, for example, assume the metafile includes a set of domains such as peer.aka.net, peer.cdn.net, and the like, each of which is resolved by the CDN DNS query mechanism, which is authoritative for all domains returned in the metafiles. In this example, the first domain is designed to be resolved to another peer in the P2P network, and the second domain is designed to be resolved to an edge server in the CDN network (thus acting as a failover in this example). This ordering is merely representative, as the order may be switched so that the peer is the backup. In either case, the peer node client then makes a DNS query to the first domain or sub-domain in the list, and that DNS query is resolved through the CDN DNS query mechanism to (in this example) identify a nearby peer in the P2P network from which the content can be fetched. If this operation fails, if the peer cannot contact the identified peer, or if the identified peer (once contacted does not have the content), the second domain is tried, this time returning an edge server in the CDN. This will be an edge server that is nearby, that is likely to have the content, and that is not overloaded.

As can be seen then, in this way the hybrid CDN-P2P leverages peer nodes or allows peer nodes to leverage the CDN infrastructure.

In an alternative, the peer node is provided with software agents and other intelligence and includes the ability to make a more intelligent selection of the peer nodes or the CDN edge server regions or edge servers therein. In such case a given peer node (once established within a given CDN trust domain) is provided with the ability to probe its surrounding network (which may include CDN infrastructure) and to create a local map that can be used to facilitate more intelligent mapping decisions. In this way various components of the CDN mapping infrastructure are themselves off-loaded to trusted peers to provide active mapping decisions within or across the P2P network entities.

As noted above, a feature of the present invention is that a P2P network (or given nodes therein) may use the CDN as a failover in the event given content is not available from one or more peers. In this case, the CDN acts as a backstop so that the given content can be obtained without the end user having to return to the content publisher (typically an origin site infrastructure). This enables the CDN to act as a repository of last resort for certain content, such as "cold" content that is not likely to be accessed on an active basis.

The hybrid CDN-P2P model provides advantages. Using this approach, P2P models will be able to provide better performance and availability at virtually no cost for the delivery component. Moreover, CDN service providers can use P2P resources as needed to augment or bolster their edge server delivery capabilities. Thus, for example, the CDN edge caches may act as the origin for the P2P network, with eventual switchover to the P2P once the content becomes available through the CDN. In this way, the CDN bootstraps or acts to prime the P2P network delivery, after which the P2P may take over primary delivery responsibility. In an alternative embodiment, the CDN also have distributed storage capabilities so that a more complete content offload may occur. Thus, for example, the content may be initiated uploaded (e.g., by FTP (File Transport Protocol) or the like) to the CDN distributed storage, which then acts as the initial origin to the edge caches, followed by use of the P2P once the CDN has primed the network.

Preferably, the hybrid CDN-P2P network is digital rights management (DRM)-enabled to ensure that peers do not obtain access to and otherwise transfer (to other peers) content in a way that avoids monetization (either for the original or downstream delivery). A DRM-enabled hybrid CDN-P2P would also enable the CDN service provider to manage the content delivery efficiently on behalf of participating content providers. One technique for using DRM within the context of a CDN is described in U.S. Published Application No. 2005/0278259, owned by Akamai Technologies, Inc.

Figure 4:
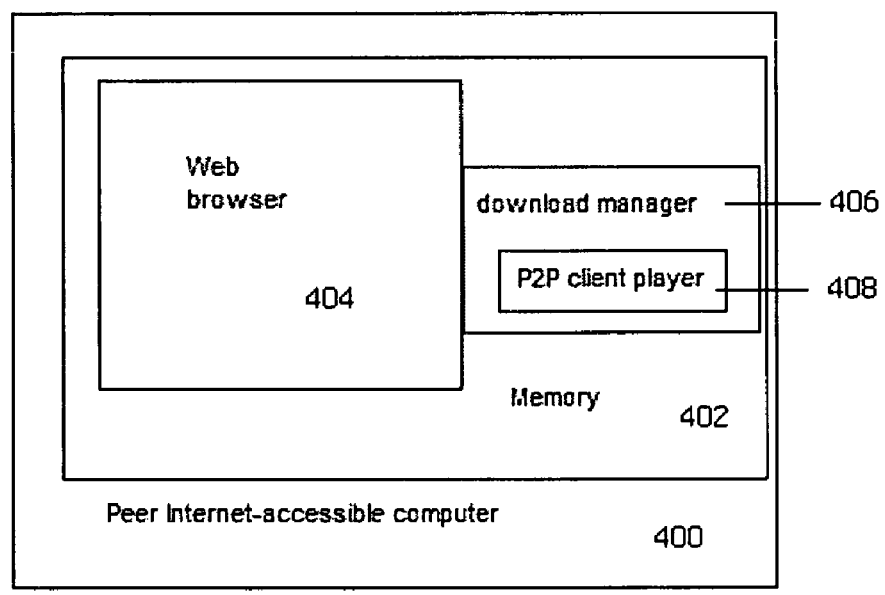
FIG. 4 is a representative peer Internet-accessible machine that includes a download manager provisioned as a peer client.

According to another feature of the invention, it is desirable to have two (2) different types of clients in the system, corresponding generally to a client server, and a client player. In the prior art, these components are part of the same P2P technology; thus, if an entity desires to download from a client it also has to offer up to others the ability to download from it. In this embodiment, P2P transport is facilitated using a client server that functions as a conventional P2P client does in that it plays and serves the content that is fetched. Preferably, however, the client player is a simple plug-in (e.g., an ActiveX control, although this is not required) that interfaces with (or runs in or as part of) an end user client browser to obtain a file (e.g., from the P2P server instead of the CDN). Preferably, the client player has a firewall penetrating capability but does not include a P2P serving capability. In effect then, the client player is not accessible or used by the CDN (or others) for the P2P delivery of the content to other peers. By splitting the client-servers functions in this manner, adoption and use of the client player is simple and ubiquitous. Thus, in a representative embodiment, the client player simply is a component of some other CDN-related or other software, such as a download manager that is used to facilitate large file downloads from the CDN. In such case, the conventional CDN large file download manager is augmented with appropriate code functionality so that it coordinates downloads from either a conventional CDN server (or perhaps a customer origin) or a P2P network server. The augmented download manager is easy to install, is not characterized as malware or the like, and it does not use any resources for serving files to others. To facilitate its use, the download manager (as modified to provide the P2P client player) also includes appropriate intelligence (e.g., one or more software routines and appropriate data) to facilitate a determination about whether to obtain a given object from the CDN or the P2P, as the case may be, and from which server(s). Typically, this determination is based one or more factors or metrics such as performance, locality, cost, content availability, or some combination thereof. FIG. 4 illustrates the approach. In this drawing, the peer is a machine (an Internet-accessible machine running commodity hardware and an operating system) having a browser, and a download manager operating as an ActiveX control. The download manager has been augmented according to the present invention to include the P2P client player and related functionality as described above.

As noted above, the client player may be implemented in any convenient manner (e.g., as a browser plug-in, a servlet, an applet, native code, or the like). In a preferred embodiment, it is made distributed as a component of a download manager (or equivalent) that the CDN uses to facilitate large file downloads to requesting end users. FIG. 4 illustrates this functionality. In this embodiment, a peer Internet accessible machine 400 comprises memory 402, web browser 404, download manager 406, and P2P client player 408.

An edge server also may incorporate mapping-related data into a decision where to service a given content request (e.g., using the edge network and/or the peer network). As noted above, the content delivery network tracks the load information for a given CDN customer across the network, and the CDN mapping infrastructure may send this data to an edge server in an automated way so that the edge server can use it to determine how and what traffic to send to the edge vs. peer network. Likewise, if the peer network collects load information, it may also report load and other data (e.g., how loaded the peer network is, how many peers are live, where the peers are located, and the like). The decision about which network to use (edge and/or peer) may be made by the edge server when the edge server actually receives a content request (i.e., after the CDN DNS has identified the edge server region and edge server, as described above, and the browser has actually requested the content from the edge server) This approach may take advantage of a client such as shown in FIG. 4. In particular, it is assumed that the client installed on the user's desktop has the capability of adding a signature to the installed browser's http or other request headers. This signature may be added to a User-agent request header, the Accept-language header, or the like. Typically, the User-agent or other such request header can be modified via the local registry on Windows-based machines. (Alternatively, the signature may be encoded in or delivered to the edge server in some other fashion, such as part of a URL). When the edge server receives the request for an object that is being delivered over the hybrid CDN-P2P network, it checks to see if the client signature is associated with the request. This check may be performed under the control of a metadata handling process such as described in U.S. Pat. No. 7,240,100, or in any other convenient manner. If the client request has the signature in the request, the edge server can then choose how to handle that request, i.e., by delivering the object itself, or redirecting the request to a peer network resource. If the latter case, the peer network resource may initiate the delivery, or even redirect the request back to the edge server or some other CDN resource. Load and traffic data may then be used to facilitate these decisions, as previously described.

The invention claimed is:

1. In a content delivery network (CDN) having an edge network comprising CDN content servers and a CDN domain name service, a delivery method comprising:
  receiving customer content uploaded to the CDN;
  storing the customer content in the CDN content servers or in a storage network associated with the edge network;
  associating a set of peer machines with the CDN, wherein the set of peer machines are distinct from the CDN content servers and comprise a peer-to-peer (P2P) network that is distinct from the CDN;
  receiving a request associated with the customer content;
  returning, in response to receiving the request, a metafile that includes an ordered set of domains or sub-domains, wherein one or more of the domains or sub-domains is resolved, by a DNS query to the CDN domain name service, to an address associated with either a CDN content server in the CDN content servers or a peer machine in the set of peer machines;
  serving the customer content from a first successfully resolved domain or sub-domain identified in the metafile.

2. The method as described in claim 1 wherein the edge network is used to deliver the customer content initially, after which the P2P network assumes primary delivery responsibility for the customer content.

3. The method as described in claim 1 wherein a given peer machine in the P2P network comprises a download manager that includes a P2P client component.

4. The method as described in claim 1 wherein the set of domains or sub-domains includes a name that is resolved by the CDN domain name service to identify an IP address associated with the CDN server.

5. The method as described in claim 1 wherein the set of domains or sub-domains includes a name that is resolved by the CDN domain name service to identify an IP address associated with the peer machine.

6. The method as described in claim 1 wherein the customer content is delivered by the CDN server.

7. The method as described in claim 1 wherein the set of domains or sub-domains includes one or more domains that are resolved by a DNS-based mapping system associated with the CDN.

8. The method as described in claim 7 wherein the method further includes delivering a component of the DNS-based mapping system to a peer machine.

* * * * *